March 10, 1942.　　F. A. NICHOLSON ET AL　　2,276,240
MECHANISM FOR MATCHING AND JOINTING LUMBER FROM
STOCK OF NON-UNIFORM DIMENSION
Filed Dec. 21, 1936　　5 Sheets-Sheet 1

INVENTOR.
WILMOT T. PRITCHARD
FREDERICK A. NICHOLSON
BY
*G. Dwight Arnold*
ATTORNEY

Fig. 3

UNITED STATES PATENT OFFICE 2,276,240

MECHANISM FOR MATCHING AND JOINTING LUMBER FROM STOCK OF NONUNIFORM DIMENSION

Frederick A. Nicholson and Wilmot T. Pritchard, Seattle, Wash., assignors to Stetson-Ross Machine Company, Seattle, Wash., a corporation of Washington Application December 21, 1936, Serial No. 116,964

2 Claims. (Cl. 144—36)

This invention relates to mechanism for matching and jointing lumber from stock of nonuniform dimension.

More particularly this invention relates to a mechanism wherein lumber stock is reduced to a predetermined dimension before subjecting such lumber stock to the final matching or jointing operation.

In cutting the lumber stock from the tree, most mills will cut predetermined sizes of cants or timbers from the log and the remainder will be cut to permit most complete utilization of the lumber stock remaining. For example, in the fir lumber mills a large size piece of timber or cant, such as 12" x 24" of the length of the logs are often cut. At all times such cants are of full size and often are run considerably oversize in order to insure that this cant will not be undersize. That is, in cutting timber or cants to fill an order it is the practice to cut oversize to insure that the cant or timber will not be of a size less than the dimensions required by that order. The tendency is to cut oversize and many times much oversize to take care of any errors which may arise by reason of the mechanical limitations of the equipment or human errors, which inaccuracies particularly arise by reason of the great speed at which it is attempted to work the equipment, as required by present day commercial operations. The remainder of the log is then cut into sizes to be used for other stock, as flooring stock.

In flooring stock, the lumber stock rough sawn to 1" x 3" is finished to approximately $^{25}/_{32}$" x 2⅝". The next size flooring is rough sawn to 1" x 4" and is finished to $^{25}/_{32}$" x 3⅝". The next commercial size flooring known is rough sawn to 1" x 6" and is finished to $^{25}/_{32}$" x 5⅝". After the stock is thus cut to reserve sufficient for finishing, the stock is sorted out as 1" x 3" stock, 1" x 4" stock or 1" x 6" stock. Very often due to the fact that this stock is cut from the remainder of the log, it will not measure up to full width and a piece intended for 1" x 4" stock, for example, will not have sufficient excess to permit finishing to $^{25}/_{32}$" x 3⅝", so that the same must be put in the 1" x 3" stock. Also a piece in the 1" x 6" stock may be a small amount under width so that it must go in the 1" x 4" stock. This remainder of the log may be of such a size so that when stock is cut therefrom there will be provided a number of pieces roughly sawn which will measure less than enough reserve to finish a board to a width of 5⅝" therefrom and more than enough to finish a board to a width of 3⅝". These will be too small for the 1" x 6" stock and may be up to 1⅞" over the finished width of a 3⅝" finished piece of lumber.

Besides the boards that are undercut in width, many boards shrink in the drying operation so that they shrink undersize and must be put in the next smaller size. Also many boards must be placed in the next smaller stock because of the imperfection and inaccuracies, due to the rough sawing operations. For example, it is the practice to speed up the production of the rough saws as much as possible and in approaching the mechanical limitations of the rough sawing means, the saws will often tend to follow the grain of the stock, rather than following a straight line. Also in an attempt to increase the production the lumber is fed past the rough sawing means at such high speed, which places such excessive strains on the sawing means, that the sawing means will tend to bend and not saw in a straight line. Such lumber is often encountered and is generally termed in the art as "snakey lumber." It is readily seen that if a board is attempted to be sawn, for example to 1" x 4" size, so that the same will dress out $^{25}/_{32}$" x 3⅝", and the edges are waivered with indentations therein amounting to as much as ½", such lumber can only dress out to $^{25}/_{32}$" x 2⅝" and will be undersized for rough sawn 1" x 4" stock.

The modern lumber manufacturing plant is an in-line production establishment. In such an establishment, for reasons above set forth, the lumber stock fed to a planer will come from the line of production with many overwidth boards. This has proved a serious problem in the lumber trade. Many solutions have been attempted, none of which have been completely successful.

Attempt has been made to sort out the overwidth pieces so that they were not mixed in with the pieces of substantially the proper width. This has proved unsatisfactory, because of labor costs in separating out these oversize boards, and it has also proved unsuccessful because the oversize boards must be cut down to the right size by sawing mechanisms as a separate operation. This, of course, again increased the cost. When these sorted out overwidth boards in lots or loads are run through a matcher or edge jointer without being reduced substantially to the proper width this places an extremely heavy overload on the matchers or edge jointers and often "burns out" the motors. It has been impractical to increase the size of the motors to take care of the overloads because if the horse power of the motors was calculated for efficiency at normal running loads, the motors would be undersized for the overload of running selected overwidth boards. On the other hand, if the motor horse power were selected to take care of overwidth boards, the motors would be inefficient at normal loads, and there is also the physical limitations concerning space required by larger motors.

The most successful prior art commercial practice, therefore, has been to run the boards indiscriminately through the planer, whether they were overwidth or standard width and thereby prevent overloads on the motors for long periods. However, the matcher and edge jointer mechanism would not operate successfully at a high rate of speed on such a heterogeneous stock, including overwidth boards, and it has been necessary to slow down the rate of production by approximately 50%, in many cases, to permit the matcher or edge jointer to run on mixed stock. The failure to slow down has caused such an increased load on the machine that the machine stopped because of such overload conditions on the operating parts, or because of break-up of the lumber stock within the machine and costly shut downs incident to removing the pieces of the jammed stock.

In the in-line production lumber mills it has been considered that the most desirable commercial practice was to run the stock mixed, i. e., with the overwidth pieces appearing when they would, and to permit the edge matchers or edge jointers to remove the excess width and to slow down the machine to a practical commercial speed, considering the particular stock being run. Besides overwidth pieces which appear in a given stock, very often a mill will have a sale for $25/32''$ x $2\frac{5}{8}''$ lumber, and they will have considerable 1" x 4" rough stock on hand. If the 1" were cut off to get the lumber down to proper rough size, this one inch piece cut off would be a useless piece of lumber stock and the labor required in handling the stock, in cutting off this one inch, and disposing of the same would be an unnecessary cost. Therefore, it has been the practice to often run 1" x 4" rough stock or larger to produce $25/32''$ x $2\frac{5}{8}''$ finished lumber. This excess width was removed by the edge jointers or matchers and conditions similar to the overwidth pieces heretofore considered would obtain.

Thus, in commercial practice at in-line production lumber mills, non-uniform boards have been run direct to the matcher and edge jointer mechanism and the speed of production has been slowed down to permit the mechanism to operate on stock, including many overwidth boards therein. However, this slowing down of the rate of production has not taken care of the problem for many reasons. First, if a cutter head attempts to take off more than substantially ½" of stock, at practical production rates of feed, we have discovered, after extended experimentation, that the tearing action of the cutter head in removing such a large part of stock causes a force tending to rip and tear the grain of the stock in excess of the cohesive strength of the stock to withstand such ripping or tearing. The result has been, therefore, to loosen or rip the grain below the cut edge approximately $\frac{1}{32}$nd of an inch or $\frac{1}{16}$th of an inch, depending upon the character and species of the stock, speed or operation, and the amount being cut off. Second, due to the fact that the chip breakers will be violently urged outwardly by an overwidth piece of stock, the cutter heads tend to misalign the lumber stock and to side or edge snip the tail end of a preceding board of substantially the proper width, as well as the leading end of a trailing board of an extremely wide width. This violent urging of the chip breakers out of position tends to leave the lumber stock unsupported and free to vibrate and become snipped.

We have discovered that pre-edge jointer or a pre-edge hogger means may be placed in combination with a planing machine so that the stock will be prepared for final edge jointing by the matcher heads in the planing machine and substantially perfect edge jointing or matching will result.

In providing for pre-jointing or pre-hogging the board, we find that it is most desirable to adopt the following procedure: First—An inside cutter is provided to joint off the crooks and bumps only to provide a true edge to run against the long guide extending through the machine. It is important to have a true edge to follow the guide and this is particularly true as the lumber stock passes through the finishing, tonguing and grooving or matching or edge jointer. Second— A pre-jointing or pre-hogging cutter head is positioned to operate on the opposite edge of the board and to remove all excess width from the lumber stock. Inasmuch as the hogging head for a given dimension of the stock, as width, removes in oversized boards, all excess stock over a predetermined preliminary dimension, it sizes the stock and therefore such hogging head is preferably referred to as a presizing-hogger head means or prehogger. The prefix "pre" is employed because, in our invention, the excess stock over said dimension is removed prior to the stock reaching the conventional final finishing cutter heads.

We have also found that if the edges of the lumber are thus pre-hogged or pre-jointed, just prior to entering the planing machine, that the extreme vibration which is set up by such edge jointing in removing excessive lumber stock may be isolated from the planing machine so as not to interfere with the operation of the planing machine in providing a smooth surface and permit the highest quality of finishing work possible.

We have also found that any tearing or gouging or injuring which is caused by the pre-edge jointers or pre-edge hoggers will not extend ordinarily into the edges of the lumber more than about $\frac{1}{32}$nd of an inch or about $\frac{1}{16}$th of an inch so that sufficient excess may be reserved so that this torn, gouged or injured portions will be removed by the final edge jointers or matchers.

We have also discovered that the removal, by a pre-edger or pre-hogger, of excessive width from one edge of the board, does not interfere with the final edge jointing of the board, despite the fact that ordinarily extremely heavy cuts on one edge tend to pull the board away from the fixed guide line. This is due to the fact that the feeding mechanism of the planer is positioned between the pre-hogging device and the final edge matchers so that such feeding mechanism will force the lumber against the fixed guide edge and overcome any tendency of the hogging device to pull the lumber away from the guide edge because of excessive heavy cutting.

We have also found that the lumber may be run at an extremely high rate of speed, such as five hundred feet per minute, regardless of the uniformity of the width of the stock being fed. This is to be contrasted with prior art machines where the speed was commercially reduced substantially 50% when mixed stock, including many overwidth boards, was run through the machine.

We have also found that where a pre-edge jointer or a pre-edge hogger is employed just prior to the lumber entering the planing machine, that it will not interfere with the practical in-line production mill practices of today, so that lumber is not decreased in width until it is actually determined just what lumber is to be produced from said lumber stock.

The primary object of our invention is to provide a mechanism which will overcome the many complex difficulties detailed above, and to provide a mechanism characterized by a greatly increased efficiency, and a decided saving in operation in connection with one of our most important natural resources. Particularly is it our object to prevent the wasting of stock on which much labor has been spent by reason of the tearing or gouging of the grain of the wood and the snipping of the end portions. Further, it is an object of this invention to provide connecting mechanism between this "pre-hogging" machine of the present invention and the planer machine with which it is associated or connected in operation, so that the operations of each are synchronized and dove-tailed with the other.

In practice where a board is edge snipped, the final matcher or jointer heads gouge out a portion on one edge of the board and provide an oppositely disposed raised portion adjacent thereto. The length of the edge snips often run four or five inches. Whenever stock is edge snipped, it is necessary to remove such edge snips to provide perfect processed lumber. To remove the portion of the stock which is edge snipped, requires reducing the length of the stock to the next shorter standard length to comply with standard grading rules and practices. In some boards and lengths, there is a two foot difference between standard lengths, so a snipped edge will require in some cases a loss of two feet of timber stock. For example, if a twelve foot board has an edge, at one end thereof, snipped it will be necessary to cut the board to a ten foot board to remove such snipped edge as there is no standard eleven foot length board, involving on such a board a loss of sixteen and two thirds percent of the stock. Such loss has heretofore involved an annual loss of tremendous proportions of one of our chief natural resources and the machine embodying our invention operates with only a negligible or no loss whatever caused by edge snipping, thus conserving time, labor and one of our valuable fast diminishing natural resources.

The above mentioned general objects of our invention, together with others inherent in the same, are attained by the mechanism illustrated in the following drawings, the same being preferred exemplary forms of embodiment of our invention, throughout which drawings like reference numerals indicate like parts.

Figure 1:
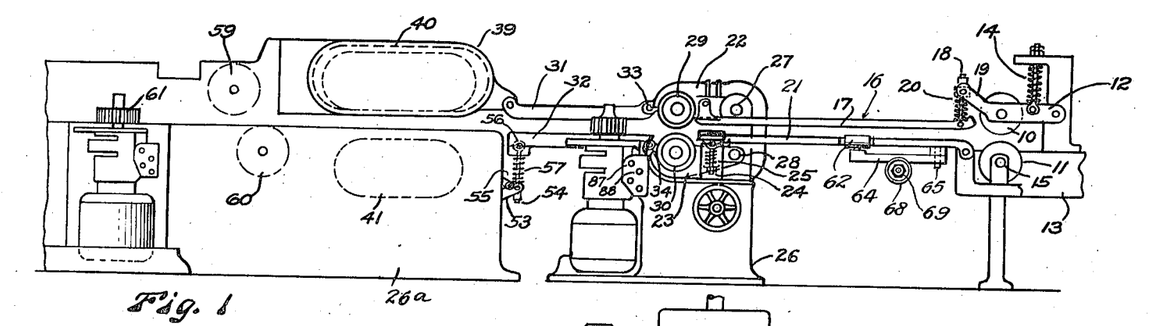
Figure 1 is a view in elevation, with parts omitted, of an assembly of a device embodying our invention.

Traveling lumber stock is fed by any suitable means, such as a standard feeding table, to driven feed rolls 10 and 11, of which said rolls are a part. Feed roll 10 is a resiliently mounted roll; that is, it is urged upwardly by lumber passing thereunder. This may be accomplished by the following means: arm 12 has one end portion pivotally connected with the main frame portion 13 of the machine. Intermediate the length of the arm 12 is journaled the feed roll 10. The swinging end of arm 12 is resiliently urged downwardly by suitable spring means diagrammatically illustrated by spring 14. The lower feed roll 11 is journaled in bearings 15 supported by the main frame of the machine.

A transfer means generally indicated by 16 in Figure 1 is provided to transfer stock from a fixed lower roll in the feed table to a lower resiliently supported feeding means in the planing device. The details of this tranfer means are specifically shown in our co-pending application Serial No. 116,965, now Patent No. 2,204,439, dated June 11, 1940, and in the interest of brevity all of the details will not be here described or illustrated. This transfer means generally comprises an upper plate 17 at one end pivotally secured to a link means 18. This link 18 is pivotally secured to a projection 19 of the arm 12. A spring 20 is operatively positioned on the link 18 to provide a resilient connection between the projection 19 and the upper plate 17. The transfer means 16 also comprises a lower plate 21, which lower plate 21 has one end portion pivotally connected with the main frame portion 13 of the machine. The forward end of upper plate 17 is pivotally secured to arm 22. The forward end of plate 21 is resiliently connected to arm 23, which may be accomplished by providing a link 24 and spring 25 operatively positioned between the plate 21 and the arm 23.

The arms 22 and 23 are pivotally connected to the main frame portion 26 by means of pivots 27 and 28 respectively. Feed rolls 29 and 30 are respectively journaled in arms 22 and 23. The arms 22 and 23 are resiliently and adjustably supported by means, the details of which will be hereinafter described. The forward ends of the arms 22 and 23 are respectively connected to plate members 31 and 32 by pivot means 33 and 34 respectively.

The pre-edge jointer 35 operates through an opening 38 in the edge guide 37. The pre-edge jointer 35 is laterally adjustable by any suitable means to provide a minimum predetermined cut as indicated by line 189 (Fig. 2) on the guide edge of traveling lumber stock so that the guiding edge will travel true against guide 37 throughout the machine. Line 190 indicates line of cut made by final finishing cutter head (smoother type) 61'. To illustrate better the position of the stock, there has been added to Fig. 2 portions of boards 187 and 188. The preferable amount that is to be removed by the pre-edge jointer 35 is the minimum amount which will remove the humps, bumps, crooks and unevenness along the guide edge of the lumber stock so that the lumber stock will travel true against the guide 37.

Figure 2:
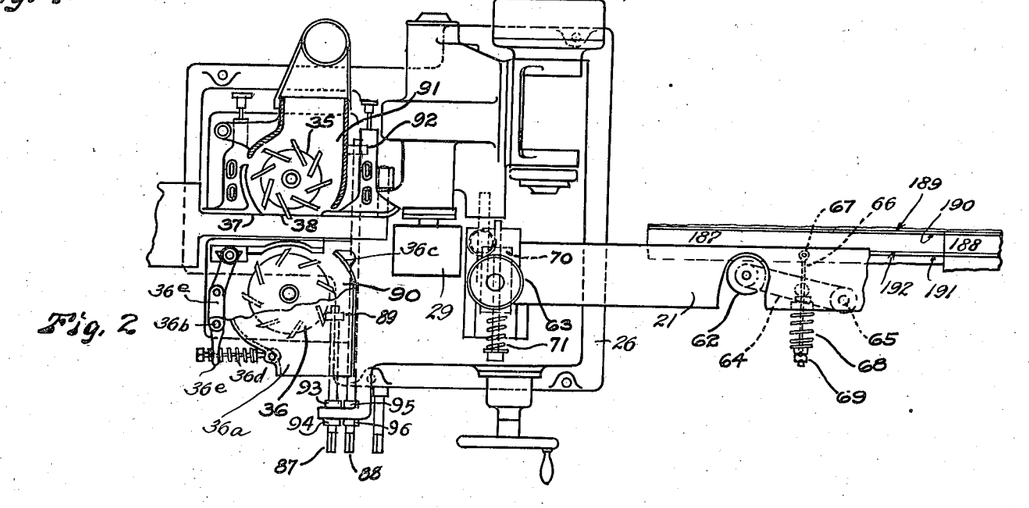
Fig. 2 is a plan view on a larger scale of a portion of the device shown in Figure 1, and showing particularly means for adjusting the pre-edge jointer means and hold-over rolls, omitted from Figure 1.
Figure 2A:
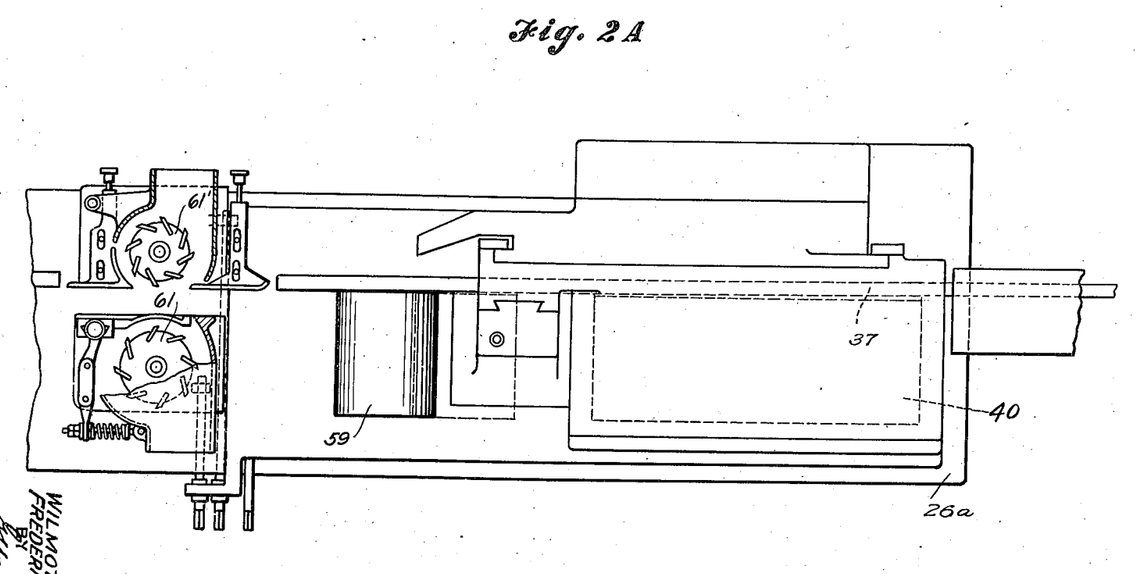
Fig. 2A is a plan view on the same scale as Fig. 2 and complements the same to show in plan the parts shown in elevation in Fig. 1.

The head 36 functioning as a presizing hogger is also laterally adjustable by any suitable means. The details of the adjusting means for laterally adjusting both the heads 35 and 36 will be hereinafter described. The hogger 36 is preferably adjusted so as to only remove all excess over a preliminary predetermined width, as indicated by line 191, (Fig. 2). Line 192 indicates line of cut made by final finishing cutter head (sizer type) 61. This preliminary predetermined width is determined as the minimum width which the stock must have so that the final edge jointers or matchers in the planing machine will provide perfect edge matching or jointing.

The forward end portion of plate 31 is pivotally secured to the frame member 39 supporting the upper feeding member 40 of the planing device. This upper feeding member may be of the endless traveling bed or caterpillar type or may be an upper feed roll means. In any event the upper feed mechanism 40 as shown in Figure 1 of the drawings, must be fixedly mounted during operation.

A feeding mechanism 41, which is operatively disposed with the feeding mechanism 40, is herein disclosed as of the endless feed bed or caterpillar type but may be of the feed roll means type. The lower feeding means 41 is resiliently mounted as disclosed in our co-pending application Serial No. 91,568, now Patent No. 2,102,186, dated December 14, 1937. This is accomplished by a pivotally supporting arm 42 to the main frame portion 43 of the machine. The arm 42 has one end portion pivotally secured to the frame 44 of the lower feed member 41. The lower end of the frame 44 of the lower feed member is pivotally secured to link means 45, which has spring means 46 operatively disposed thereon so that the link 45 has its lower end resiliently and pivotally supported by the main frame portion 43 at 47. A substantially horizontally positioned link 48 is also pivotally connected with the frame 44. The link 48 is pivotally mounted on pivot means 51 secured to the main frame portion 43 of the machine. A spring 50 is slidably disposed on link 48 between the pivot means 51 and the frame 44. Another spring 49 is slidably disposed on link 48 between pivot means 51 and nut means 52.

Link 53 has one end portion pivotally secured to main frame portion 43 of the machine. The other end portion of link 53 pivotally supports a pin 54, through which pin a link means 55 is slidably disposed. Link 55 is pivotally connected to plate 32 by means of pin 56. Spring 57 is operatively disposed on link 55 between plate 32 and pin 54 in link 53. Link 58 is pivotally connected between link 53 and the lower portion of arm or bell crank 42. Thus, as lower feed bed 41 is lowered, plate member 32 will be lowered and each of said members, i. e., 32 and 41, is independently resiliently supported.

The feed means 40 and 41 serve to urge traveling lumber past upper cutter-head 59 and lower cutter-head 60 which function to surface the upper and lower faces of the lumber stock. The feed members 40 and 41 also urge the traveling lumber stock past final finishing edge-jointers or matchers 61 and 61', which are disposed on opposite sides of the traveling lumber stock to finally joint or match both edges of the lumber stock to the exact width and pattern desired. The structure and mode of operation of the cutters 61 and 61' and their associated parts is similar to that of cutters 35 and 36 and in the interest of brevity no detailed description is given.

Hold-over rolls 62 and 63 are provided to hold the stock laterally against the guide 37. Any of the usual mounting means of a hold-over roll may be used, such as the mounting means illustrated in connection with hold-over roll 62 or the mounting means illustrated in connection with hold-over roll 63. The mounting means illustrated for hold-over roll 62 may be in the nature of an arm 64 pivotally mounted on the lower plate 32 by pivot means 65. A link 66 has one end portion pivotally connected by pivot means 67 with the lower plate 32. The link 66 slidingly passes through the arm 64 and a spring means 68 is slidingly positioned on the link 66. Nut means 69 may be provided threadedly connected with the link 66 to properly tension the spring means 68. Thus, the spring means 68 urges the hold-over roll 62 against one edge of traveling stock, urging the other edge in contact with the conventional guide 37.

The means for resiliently supporting the hold-over roll 63 may be in the nature of a block 70 slidingly mounted in the frame member 26. Tension spring means 71 serves to urge the block 70, and hold-over roll 63 journaled thereon, towards the guide 37, urging traveling stock firmly against said guide.

Figure 3:
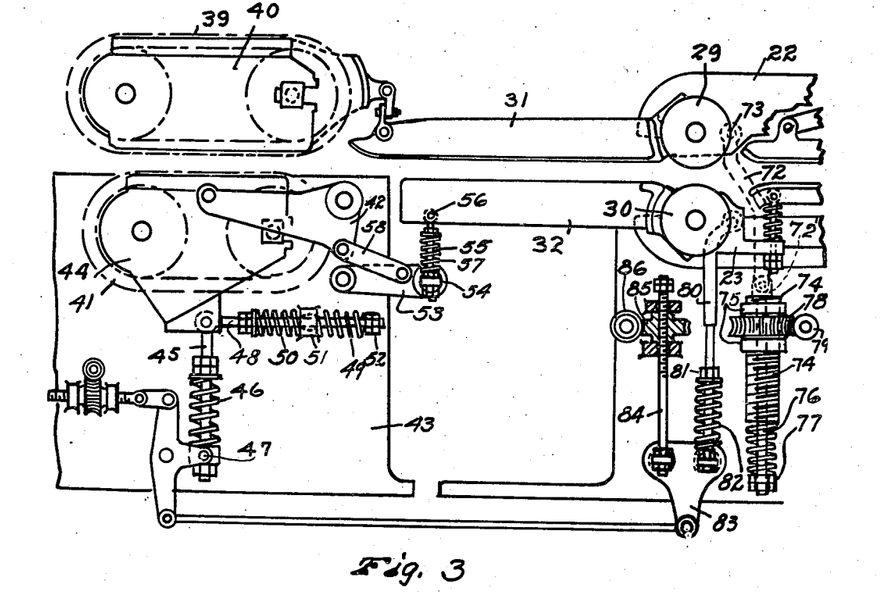
Fig. 3 is a view in elevation on a larger scale showing the means for mounting the lower feed bed for the planer and means for resiliently and adjustably supporting the upper driven feed rolls.

The means adjustably mounting arms 22 and 23, and in turn the feed rolls 29 and 30, is best shown in Fig. 3 of the drawings. Here a link 72 has one end portion pivotally connected by pivot means 73 with the arm 22. A sleeve 74 is slidably positioned on link 72 and is slidable through frame lug means 75. A spring 76 is slidingly positioned on link 72. Nut means 77 on link 72 serves to hold the spring 76 in place with the upper end abutting against sleeve 74. Clevis means 72' in link 72 serves as a stop to engage the upper end of sleeve 74. The sleeve 74 is externally threaded and a worm wheel 78 is threadedly connected with the external threads on the sleeve 74 and is held against vertical movement by frame lug means 75. A worm 79 operatively engages with the worm wheel 78. Upon angular movement of the worm 79 through the worm wheel 78, the sleeve 74 is raised or lowered, carrying with it the link 72, the arm 22, and in turn the upper driven feed roll 29. Thus, the driven roll 29 may be raised or lowered and substantially the same spring tension may be provided, regardless of the elevated position of the roll 29. The means for resiliently supporting and adjusting the lower arm 23, and in turn the lower feed roll 30 may operate similarly to the means for resiliently supporting and adjusting the upper arm 22, and in turn the feed roll 29 journaled thereon. The means shown include a link 80 pivotally connected with the arm 23. A nut means 81 is threadedly connected to link 80. A spring 82 is slidingly positioned on link 80 and between nut means 81 and a bell crank 83. The link 80 is slidable as respects the bell crank 83. A link 84 is pivotally connected with bell crank 83 and its other end is threadedly connected with worm wheel 85 which meshes with worm 86. Upon angular movement of worm 86 the link 80 raises or lowers, carrying with it the arm 23 and the feed roll 30.

Thus, the driven feed rolls 29 and 30 may be resiliently and adjustably supported so that either feed roll will equally engage with rough lumber, despite unevenness in the surface thereof. Such a floatingly mounted feeding means greatly reduces friction and permits substantial feeding forces, despite large bends or unevennesses in the surfaces of the rough lumber, with a comparatively light surface pressure of the rolls against the lumber.

Cutter head 35 is of the usual smoother type working through an opening in the guide members while cutter head 36 is of the conventional sizer type having stock presser member 36a pivoted at 36b and carrying stock contacting foot member 36c and spring parts 36d. Bracket 36e supports pivot 36b. Herein head 36 functions as a presizing hogger head means or prehogger.

The means for laterally adjusting the pre-edge jointer 35 and the hogger 36 is illustrated somewhat schematically in Fig. 2 of the drawings. Screw 87 and screw 88, which are journaled in frame portion 26, respectively engage threaded nuts 89 and 92 mounted in supporting means 90 for adjusting the hog head 36 and in supporting means 91 for adjusting head 35, respectively. Collars 93 and 94, and collars 95 and 96 are respectively fixed on screws 87 and 88 to prevent their lateral movement. Then upon rotation of either screw, the respective heads will be laterally moved, providing the required lateral adjustment and predetermining the width of a board.

The mode of operation of the device shown in Figs. 1, 2 and 3 of the drawings may be summarized as follows: Traveling stock is introduced between the feed rolls 10 and 11 of the feed table. The lumber passes between the upper plate 17, and the lower plate 21. The upper plate 17 serves to prevent lumber from piling on top of each other so that only one board at a time is fed through the channel to said plates. The said traveling lumber stock passes over hold-over rolls 62 and 63 located laterally of and in a plane between said plates 17 and 21 and is urged sidewise firmly against the guide 37. The traveling lumber stock then encounters the driven feed rolls 29 and 30 and is urged forwardly thereby. The feed rolls 29 and 30 are driven at approximately the speed of the planing machine, while the feed rolls 10 and 11 are driven at an accelerated speed so that lumber will pass the feed rolls 29 and 30 in end to end relation, all in accordance with common practice. The feed rolls 29 and 30 urge the lumber stock past the jointer 35 and the presizing hogger 36 and between the plates 31 and 32. The pre-edge jointer 35 serves to skin off the humps, bumps, crooks and unevenness from one edge portion so that the traveling stock will truly and accurately follow the guide 37. The pre-hogger 36 removes all excess over the predetermined thickness, as hereinbefore discussed. The lumber is then urged between plates 31 and 32, and between driven feed means 40 and 41. These driven feed means urge the traveling lumber stock forwardly past the cutter heads 60 and 59 and final edge matchers 61. The driven feed means 40 and 41 thus serve to isolate the shock and vibrations caused by removal of an excessive amount of stock by the presizing hogger 36 from the finishing cutter heads 59, 60, 61 and 62'. Also the feed means of the machine are able to return the traveling stock against the guide 37 and overcome any tendencies of the pre-edge jointers or hoggers to pull the stock away from the guide, due to excessive cutting, the longitudinal axis of the feed means 40 and 41 being inclined towards the guide 37 as ordinarily done to keep stock pressed against the guide. The pre-edge jointers or hoggers may be of the type mounted on a vertical shaft, as shown in Figs. 1, 2 and 3 of the drawings, or such cutter heads may be mounted on horizontal shafts as illustrated in the plan view, Fig. 7.

In the device shown in Figs. 1, 2 and 3 of the drawings, the rear end of the upper plate of the transfer means is quite freely resiliently mounted while the rear end of the lower plate of the transfer means is fixedly pivotally mounted upon the frame. The front end of the upper plate of the transfer means is more stiffly resiliently mounted than the rear end of the upper plate. This resiliency is due to the mounting of the spring. On the other hand, the front end of the lower bed-plate is relatively freely resiliently mounted so that the excess in thickness or unevenness of lumber now begins to project downwardly and thus compresses the lower resiliently mounted means, while the upper line of the lumber begins to approach more nearly the upper fixed bed-line of planer. In our invention the upper means contacting the lumber, whether the same be a plate or whether the same be a feed roll, is gradually progressively made less and less resilient. In this wise the said upper stock contacting means progressively presses the stock down until the upper side is in alignment with the fixed bed of the planer. The converse is true of the lower stock contacting means.

Figure 4:
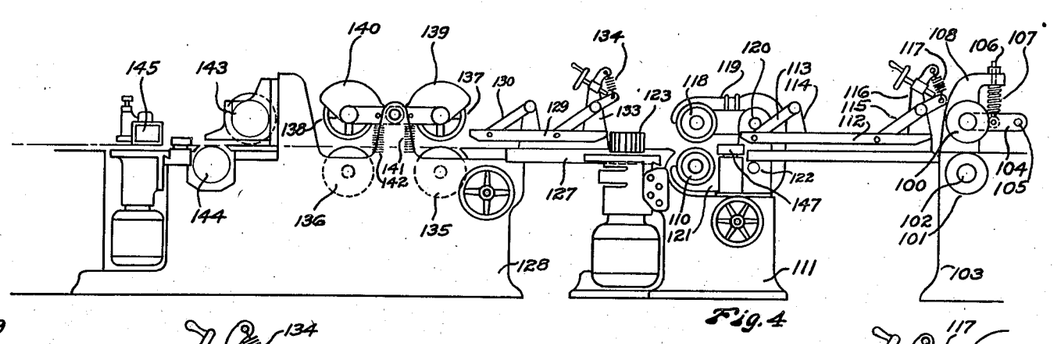
Fig. 4 is a view in elevation of a modified form of the invention similar to Figure 1.
Figure 5:
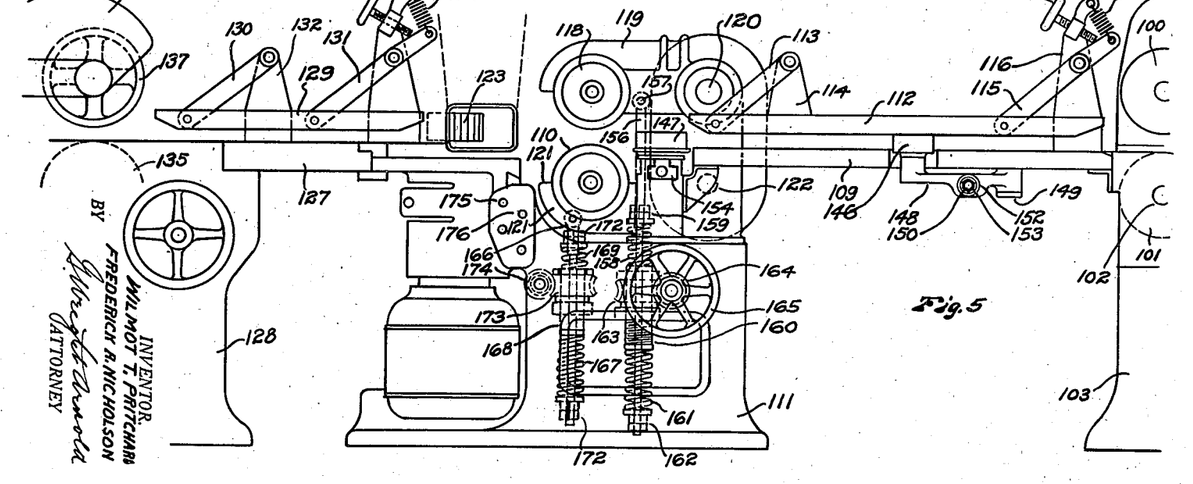
Fig. 5 is a view in elevation on a larger scale than Fig. 4, showing the pre-hogging mechanism and driving means therefor.
Figures 6, 7:
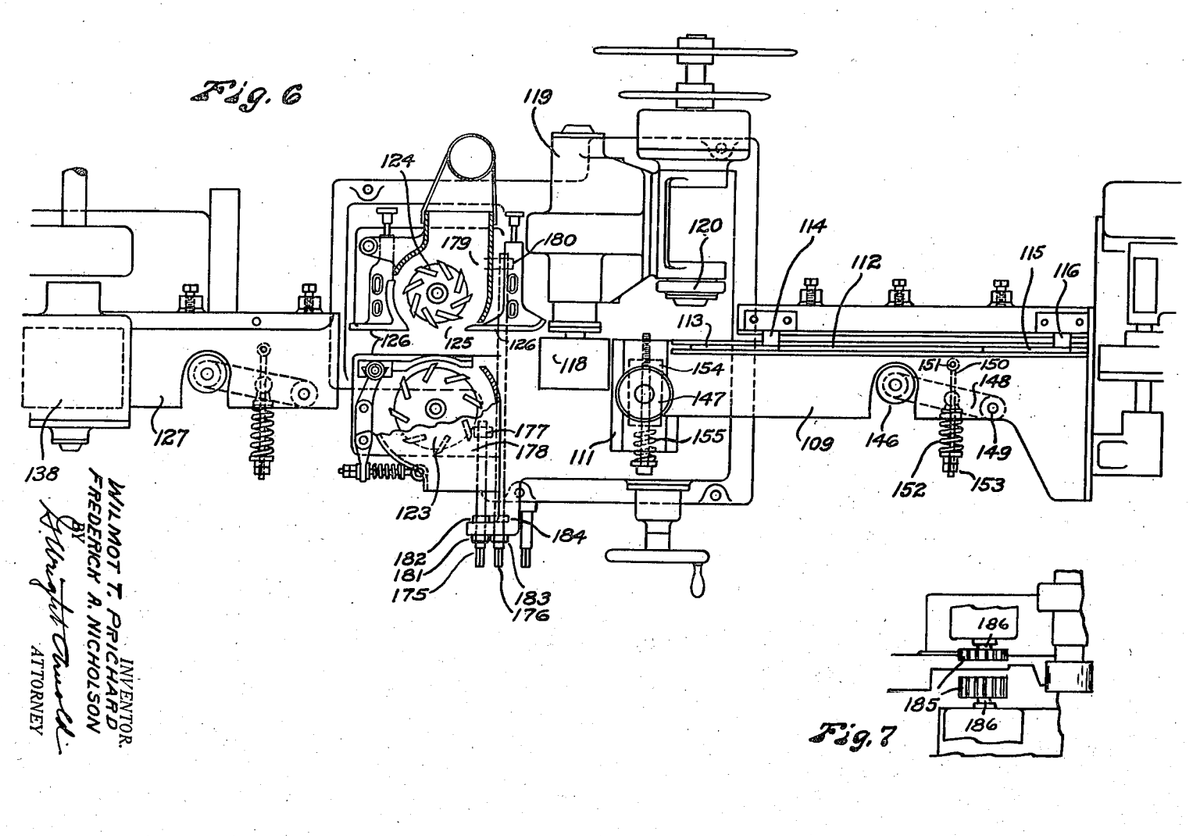
Fig. 6 is a plan view of the parts shown in Fig. 5.
Fig. 7 is a fragmentary plan view showing an alternative construction of a cutting means for the pre-edge jointer means.

In the modified form shown in Figs. 4, 5 and 6, a fixed bed-line extends throughout the mechanism from the fixed feed rolls of the feed table to the out feed rolls of the planer. The said fixed bed line is formed of a plurality of bed plates and feeding means. In operative opposed relation to such fixed bed-lines are resiliently mounted feeding means and pressure means to hold the traveling stock securely to a said fixed bed-line. In so illustrating a modified form of the planer mechanism of the prior art design with a lower fixed bed-line, we have done so only to show one environment in which our invention relative to the prehogging operation is applicable.

Referring to Fig. 4 of the drawings, lumber is fed by any usual means, such as a feeding table, between upper and lower driven feed rolls 100 and 101. The lower feed roll 101 is journaled by bearings 102 in main frame portion 103. The upper feed roll 100 is journaled in an arm 104. This arm 104 is pivotally secured to the main frame portion 103 by pivot means 105. The arm 104 is urged downwardly and carries upper feed roll 100 downwardly against the lumber stock by any resilient means, such as those illustrated by a link 106 pivotally connected with the arm 104 and having spring means 107 operatively disposed on said link 106 to resiliently connect the link 106 with arm 108 carried with the main frame portion 103. A fixed plate 109 forms a lumber supporting means between the lower feed roll 101 and another lower feed roll 110. The plate 109 is supported by fixed frame portion 103 and 111.

The lower feed roll 110 is fixedly mounted on another main frame portion 111.

The upper plate 112 is mounted for vertical movement. This may be accomplished by providing link 113 having one end portion pivotally connected with the upper plate 112 and the other end portion of link 113 pivotally connected with a bracket 114 which in turn is fixedly secured to the main frame portion 111. The other end of the upper plate 112 is pivotally connected with a link 115. The link 115 has its other end portion pivotally connected with a bracket 116 which is fixedly secured to the main frame portion 103.

A tension spring 117 is provided between the bracket 116 and a projecting portion of the link 115 urging the upper plate 112 downwardly. Upper feed driven roll 118 is journaled in an arm 119. This arm 119 is pivotally supported by bearing means 120 on the main frame portion 111. The lower driven feed roll 110 is journaled in an arm 121, which arm is pivotally mounted on the main frame portion 111 by bearing 122. The means for supporting and adjusting the arms 119 and 121 and in turn the feed rolls 118 and 110 will be hereinafter described.

The feed rolls 118 and 110 are provided so that the said feed rolls will urge lumber past said pre-edge jointers. The pre-edge jointer head 124 is disposed to operate through an opening 125 in the guide 126. This pre-edge jointer 124 is adjustable laterally by means hereinafter described. An adjustment is preferably made so that the pre-edge jointer 124 will only remove the amount of stock that is necessary to true-up the guide edge of the stock so that the same will run true against guide 126. This amount which is to be removed generally only requires the removing of the bumps, humps, crooks and unevenness from the guide edge of the stock.

The hogger or presizer 123 is also laterally adjustable by means hereinafter described. The hogger or presizer 123 is preferably adjusted so that the width of the stock is reduced to a preliminary predetermined maximum width. This preliminary predetermined width is determined as the minimum width of stock that is necessary to provide only sufficient excess so that the final edge matchers or jointers will provide perfect edge matching or jointing of the stock.

A lower plate 127 is secured between a frame portion 111 and the frame portion 128 of the planar mechanism. An upper plate 129 is vertically movable and resiliently urged downwardly by means identical with the supporting means for plate 112 which include the following parts: links 130 and 131, brackets 132 and 133 and spring 134.

After the traveling lumber stock passes between lower plate 127 and upper plate 129, it engages with driven lower feed rolls 135 and 136, which are fixedly journaled in the frame portion 128 of the planer mechanism. Upper resiliently mounted driven feed rolls 137 and 138 are mounted in yokes 139 and 140 respectively. The yokes 139 and 140 are adjustably and resiliently supported by means which are standard in the art and are schematically illustrated by springs 141 and 142 respectively. The lumber is urged by the driven feed rolls 135, 136, 137 and 138 past upper and lower face finishing cutter-heads 143 and 144. The feed rolls 135, 136, 137 and 138 illustrate a well known feeding mechanism, as driven rolls, and obviously they may be replaced by endless feed bed or caterpillar type mechanism. The said feeding mechanism also urges the traveling lumber past the final edge matchers 145, one of which is disposed on either side of the traveling lumber to provide the final edge matching or jointing of the lumber to an exact final predetermined width and shape.

Hold-over rolls 146 and 147 are provided to hold the stock laterally against the guide 126. Any of the usual mounting means of a hold-over roll may be used, such as the mounting means illustrated in connection with hold-over roll 146 or the mounting means illustrated in connection with hold-over roll 147. The mounting means illustrated for hold-over roll 146 may be in the nature of an arm 148 pivotally mounted on the lower plate 109 by pivot means 149. A link 150 has one end portion pivotally connected by pivot means 151 with the lower plate 109. The link 150 slidingly passes through the arm 148 and a spring means 152 is slidingly positioned on the link 150. Nut means 153 may be provided threadedly connected with the link 150 to properly tension the spring means 152. Thus, the spring means 152 urges the hold-over roll 146 against one edge of traveling stock, urging the other edge in contact with the guide 126.

The means for resiliently supporting the hold-over roll 147 may be in the nature of a block 154 slidingly mounted in the frame member 111. Tension spring means 155 serves to urge the block 154, and hold-over roll 147 journaled thereon, towards the guide 126, urging traveling stock firmly against said guide.

The means adjustably mounting arms 119 and 121, and in turn the feed rolls 118 and 110, is best shown in Fig. 5 of the drawings. Here a link 156 has one end portion pivotally connected by pivot means 157 with the arm 119. A spring 158 is slidably positioned on link 156 and held in position between nut means 159, threadedly connected with a link 156, and a sleeve 160, which is slidingly positioned on link 156. Another spring means 161 is slidingly positioned on link means 156 and nut means 162 serves to hold the spring 161 in place. The sleeve 160 is externally threaded and a worm wheel 163 is threadedly connected with the external threads on the sleeve 160. A worm 164 operatively engages with the worm wheel 163. The worm 164 is connected with hand wheel 165. Upon turning of the hand wheel 165 through the worm and worm wheel, the sleeve 160 is raised or lowered, carrying with it the link 156, the arm 119, and in turn the upper driven feed roll 118. Thus, the driven roll 118 may be raised or lowered and substantially the same spring tension may be provided, regardless of the elevated position of the roll 118. The means for resiliently supporting and adjusting the lower arm 121, and in turn the lower feed roll 110 is similar to the means for resiliently supporting and adjusting the upper arm 119, and in turn the feed roll 118 journaled thereon, and includes link 116, spring 167, sleeve 168, spring 169, nut means 172, worm wheel 173, and worm 174. The hand wheel is removed in the interest of clearness.

Thus, the driven feed rolls 118 and 110 may be resiliently and adjustably supported so that either feed roll will equally engage with rough lumber, despite unevenness in the surface thereof. Such a floatingly mounted feeding means greatly reduces friction and permits substantial feeding forces, despite large bends or unevennesses in the surfaces of the rough lumber, with a comparatively light surface pressure of the rolls against the lumber.

The means for laterally adjusting the pre-edge jointer 124 and the presizing hogger 123 is illustrated somewhat schematically in Fig. 6 of the drawings. Screw 175 and screw 176, which are journaled in frame portion 111, respectively engage threaded nuts 177 and 180 mounted in supporting means 178 for adjusting the hog head 123 and in supporting means 179 for adjusting head 124, respectively. Collars 181 and 182, and collars 183 and 184 are respectively fixed on screws 175 and 176 to prevent their lateral movement. Then upon rotation of either screw, the respective hog heads will be laterally moved, providing the required lateral adjustment and predetermining the width of a board.

The mode of operation of the device shown in Figs. 4, 5 and 6 of the drawings may be summarized as follows: Traveling stock, which may be introduced between the feed rolls 100 and 101 of the feed table, is urged forwardly by the driven feed rolls 100 and 101. The lumber passes between the resilient upper plate 112, and the fixed lower plate 109. The fixed upper plate 112 serves to prevent lumber from piling on top of each other so that only one board at a time is fed through the channel to said plates. The said traveling lumber stock passes over hold-over rolls 146 and 147 and is urged sidewise firmly against the guide 126. The traveling lumber stock then encounters the driven feed rolls 118 and 110 and is urged forwardly thereby. The feed rolls 118 and 110 are driven at approximately the speed of the planing machine, while the feed rolls 100 and 101 are driven at an accellerated speed so that lumber will pass the feed rolls 118 and 110 in end to end relation, all in accordance with common practice. The feed rolls 118 and 110 urge the lumber stock past the pre-edge jointer 124 and presizing hogger 123. The pre-edge jointer 124 serves to skin off the humps, bumps, crooks and unevenness from one edge portion so that the traveling stock will truly and accurately follow the guide 126. The pre-hogger 123 removes all excess over the predetermined thickness, as hereinbefore discussed. The lumber is then urged between plates 129 and 127, and between driven feed rolls 135, 136, 137 and 138. These driven feed rolls urge the traveling lumber stock forwardly past the cutter heads 133 and 134 and final edge matchers 145. The driven feed rolls 135, 136, 137 and 138 thus serve to isolate the shock and vibrations caused by removal of an excessive amount of stock by the presizing hogger 123 from the finishing cutter heads 143, 144 and 145. Also the feed rolls of the machine are able to return the traveling stock against the guide 126 and overcome any tendencies of the pre-edge jointers or hoggers to pull the stock away from the guide, due to excessive cutting. The pre-edge jointers or hoggers may be of the type mounted on a vertical shaft, as shown in Figs. 4, 5 and 6 of the drawings, or such cutter heads 185 may be mounted on horizontal shafts 186 as illustrated in the plan view, Fig. 7.

Obviously, changes may be made in the forms, dimensions and arrangement of the parts of our invention, without departing from the principle thereof, the above setting forth only preferred forms of embodiment.

We claim:

1. A planing mechanism for sizing and finishing a plurality of pieces of rough lumber stock of varying individual dimension, as width, and traveling at a relatively high rate of speed in abutting end to end relation, comprising guide means adjacent which traveling stock may be urged, as laterally with one surface or edge in edge abutting relation to said guide means; presizing hogger head means located in adjustable spaced relation to said guide means and engaging the surface opposite said one surface, as an edge of said stock, and removing from said opposite surface of the stock all excess of stock from successive pieces of stock over a common preliminary predetermined dimension, as width, determined by said adjustable spaced relation between said presizing hogger head means and said guide means, said preliminary predetermined dimension exceeding a final predetermined dimension by a reserve sufficient to include therein hogging imparted defects, whereby said opposite surface of the stock comprises surfaces of successive pieces of stock which are substantially in a common plane and the planing defects from hogging are included within a predetermined reserve on said opposite surface; feeding and holding means positioned beyond said presizing hogger head means in the path of travel of the stock and operating simultaneously with said presizing hogger head means upon different portions of the stock, said means advancing the lumber at a relatively high rate of speed in end to end relation and also absorbing and preventing from traveling there-past of the substantial vibrations produced in the stock by reason of the operation of said presizing hogger head means; lumber stock movable presser means urging stock, as laterally with said one surface of the stock in edge abutting relation to said guide means; and a sizer type final finishing cutter head, as an edge cutter or jointer, operating in adjustable spaced relation to said guide means and recutting or finishing the said opposite surface, and removing therefrom all excess of stock from successive pieces of stock over a common final predetermined dimension, as width, which dimension is less than said preliminary predetermined dimension by an amount including said reserve, said final finishing cutter head being positioned at a location to engage portions of the stock simultaneously with the engagement of other portions of the stock by the presizing hogger head means and the said feeding and holding means, whereby the final dressing or finishing of said opposite surface of the stock is accomplished in the absence of substantial vibrations, the said opposite surface, contacted by said presser means, comprises successive surfaces lying in a common plane and the stock is continuously supported due to the elimination of violent dislodgement of the presser means, and whereby the reserve, including therein the hogging-imparted defects, is removed providing a substantially perfect surface on said opposite surface.

2. A planing mechanism for sizing and finishing a plurality of pieces of rough lumber stock of varying individual dimension, as width, and traveling at a relatively high rate of speed in abutting end to end relation, comprising guide means; lumber stock presser means urging traveling stock as laterally with one surface or edge in edge abutting relation to said guide means; cutter head means projecting through an opening in said guide means, whereby said cutter head means will remove from one surface, as an edge of the stock, an amount determined by the extent of adjustable projection of said cutter head means through said guide means and provide true guiding surfaces on successive pieces of stock; presizing hogger cutter head means mounted on a shaft whose axis parallels the plane of the surface cut by said cutter head means located in adjustable spaced relation to said guide means and engaging the surface opposite said one surface, as an edge of said stock, and removing from said opposite surface of the stock all excess of stock from successive pieces of stock over a common preliminary predetermined dimension, as width, determined by said adjustable spaced relation between said presizing hogger cutter head means and said guide means, said preliminary predetermined dimension exceeding the final predetermined dimension by a reserve sufficient to include therein hogging imparted defects, whereby said opposite surface of the stock comprises surfaces of successive pieces of stock which are substantially in a common plane and the planing defects from hogging are included within a predetermined reserve on said opposite surface and whereby the pull of said presizing hogger cutter head means on said stock in the direction away from said guide means is substantially compensated by the action of said stock presser means towards said guide means; feeding and holding means positioned beyond said presizing hogger cutter head means in the path of travel of the stock and operating simultaneously with said presizing hogger cutter head means upon different portions of the stock, said means advancing the lumber at a relatively high rate of speed in end to end relation and also absorbing and preventing from traveling there-past, of the substantial vibrations produced in the stock by reason of the operation of said presizing hogger cutter head means; lumber stock movable presser means urging stock, as laterally with said one surface of the stock in edge abutting relation to said guide means; and a sizer type final finishing cutter head, as an edge cutter or jointer, operating in adjustable spaced relation to said guide means and recutting or finishing the said opposite surface, and removing therefrom all excess of stock from successive pieces of stock over a common final predetermined dimension, as width, which dimension is less than said preliminary predetermined dimension by an amount including said reserve, said final finishing cutter head being positioned at a location to engage portions of the stock simultaneously with the engagement of other portions of the stock by the presizing hogger cutter head means and the said feeding and holding means, whereby the final dressing or finishing of said opposite surface of the stock, is accomplished in the absence of substantial vibrations, the said opposite surface, contacted by said presser means, comprises successive surfaces lying in a common plane and the stock is continuously supported due to the elimination of violent dislodgment of the presser means, and whereby the reserve, including therein the hogging imparted defects, is removed providing a substantially perfect surface on said opposite surface.

FREDERICK A. NICHOLSON.
WILMOT T. PRITCHARD.